United States Patent [19]

Warner et al.

[11] Patent Number: 4,989,882
[45] Date of Patent: Feb. 5, 1991

[54] SHAFT SEAL WITH PREDETERMINED MOUNTING PARAMETERS

[76] Inventors: Dale J. Warner, 3916 Belmoor Dr., Palm Harbor, Fla. 33563; Dale J. Warner, 2085 Swan La., Safety Harbor, Fla. 34695

[21] Appl. No.: 407,117
[22] Filed: Sep. 14, 1989
[51] Int. Cl.$^5$ .................. F16J 15/34; F16J 15/38
[52] U.S. Cl. ...................... 277/11; 29/445; 277/81 R
[58] Field of Search ............ 277/9, 9.5, 11, 81 R, 277/96.1, 93 R, 128, 87, 42, 83, 85, 1; 29/445, 467, 469

[56] References Cited

U.S. PATENT DOCUMENTS

| 3,315,969 | 4/1967 | Duff | 277/11 |
|---|---|---|---|
| 3,897,957 | 8/1975 | Warner | 277/85 |
| 3,947,944 | 4/1976 | Washington | 277/9.5 X |
| 3,972,536 | 8/1976 | Warner et al. | 277/83 |
| 4,434,986 | 3/1984 | Warner | 277/42 |
| 4,434,988 | 3/1984 | Warner | 277/93 R X |
| 4,639,000 | 1/1987 | Warner | 277/87 X |
| 4,688,807 | 8/1987 | Warner | 277/81 R X |
| 4,906,008 | 3/1990 | Warner | 277/38 X |

FOREIGN PATENT DOCUMENTS

| 675246 | 7/1979 | U.S.S.R. | 277/9 |
|---|---|---|---|
| 868790 | 5/1961 | United Kingdom | 277/9 |

Primary Examiner—Allan N. Shoap
Assistant Examiner—Scott Cummings
Attorney, Agent, or Firm—Hill, Van Santen, Steadman & Simpson

[57] ABSTRACT

A shaft seal has a rotary seal and a stationary seal with predetermined axial and radial dimensions. The two seals are positioned, with respect to a shaft, so as to fix the axial and radial dimensions with respect to one another by way of a plastic strip which is positioned about the sleeve of the rotary with its edges engaging the rotary and the stationary seals and extends to the exterior thereof. A tab is provided at the end of the plastic strip and the strip is pulled from the seal after axial and radial fixation of the seal components and upon rotation of the shaft.

9 Claims, 1 Drawing Sheet

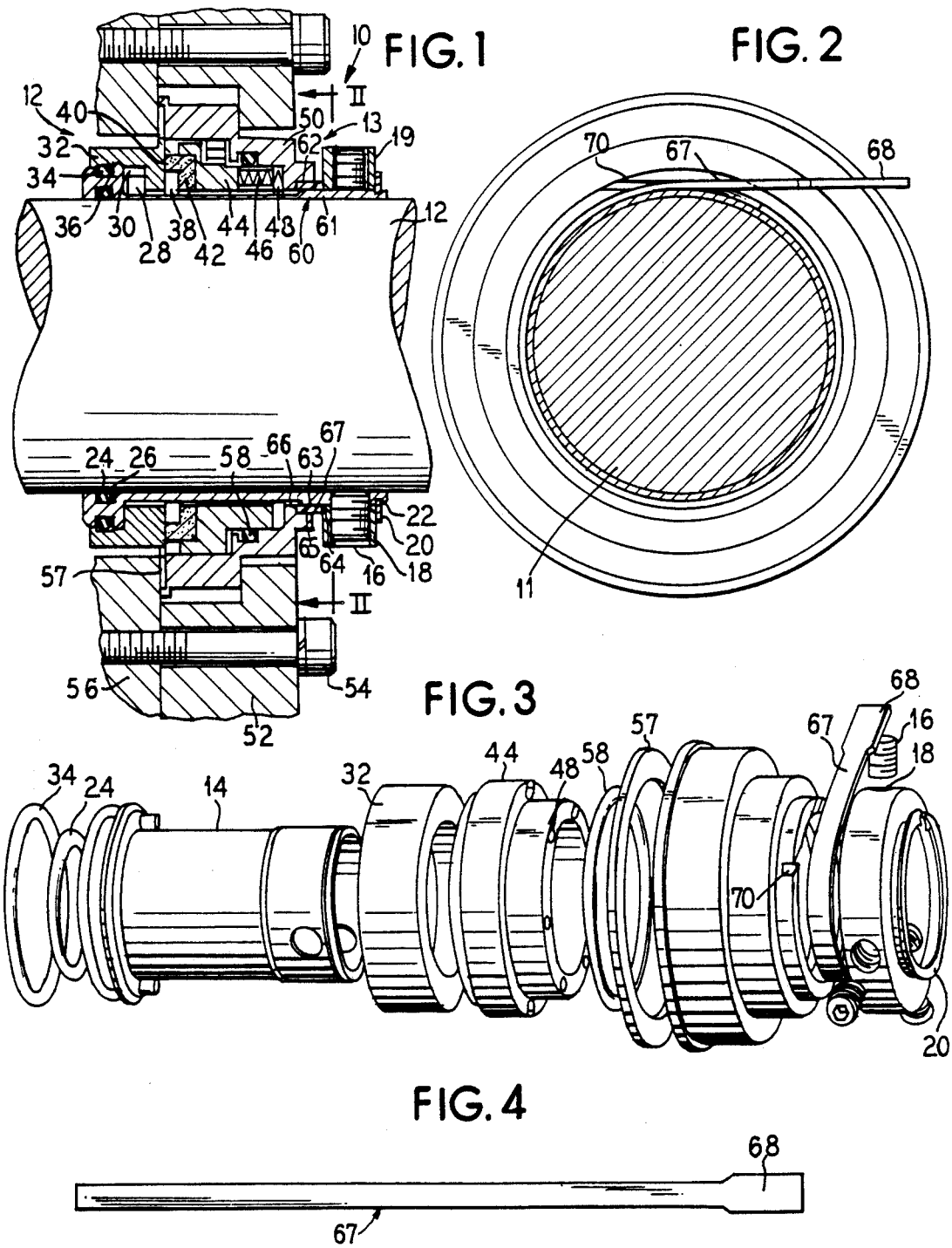

SHAFT SEAL WITH PREDETERMINED MOUNTING PARAMETERS

BACKGROUND OF THE INVENTION

1. Field of the Invention

The present invention relates to a shaft seal and more particularly to a shaft seal in which the lock ring is predeterminately spaced with respect to the housing assembly by way of a removable centering strip.

2. Description of the Prior Art

Heretofore, it was common practice to provide a shaft seal with an integral or separate lock ring for fastening the rotary to the shaft. With such a construction, it was also common practice to provide a shaped lock ring or a shaped screw and a profiled housing assembly to abut the housing assembly during installation, and later to be removed, for centering with respect to the shaft and with respect to the housing assembly.

SUMMARY OF THE INVENTION

It is an object of the invention to provide a simple apparatus for ensuring that the rotary and stationary components of a shaft seal are properly positioned axially and radially relative to one another.

This and other objects are achieved, according to the present invention, in that the seal includes a sleeve which is to be mounted on a shaft, a seal housing which fits over the sleeve and includes a peripheral recess or groove facing a lock ring, and in which a plastic strip, such as Teflon or Delrin is installed in the groove so as to abut the interior end face of the groove and the lock ring and set the axial spacing and the radial spacing of the seal with respect to the machine wall. After installation, the shaft is rotated and the end tab of the plastic strip is pulled tangentially with respect to the shaft to essentially unwind and release the same from the assembly.

BRIEF DESCRIPTION OF THE DRAWINGS

Other objects, features and advantages of the invention, its organization, construction and operation will be best understood from the following description taken in conjunction with the accompanying drawing, on which:

FIG. 1 is a sectional view of a shaft seal mounted to a machine wall and constructed in accordance with the present invention;

FIG. 2 is a sectional view taken substantially along the line II—II of FIG. 1;

FIG. 3 is an exploded view of the elements of the shaft seal of FIG. 1; and

FIG. 4 is a plan view of the centering strip.

DESCRIPTION OF THE PREFERRED EMBODIMENT

Referring to the drawing, a shaft seal is generally illustrated at 10 for a shaft 12.

The seal comprises a sleeve 14 which is mounted to the shaft 12 by way of a plurality of set screws 16 which are circumferentially spaced about the shaft 12 and received in threaded bores 18 of a lock ring 19. The lock ring 19 is fixed in the axial direction by way of a snap ring 20 received in a groove 22 in the sleeve 14.

The sleeve 14 includes a groove 26 receiving an O-ring 24 for sealing the same to the shaft 12.

As is evident, the sleeve 14 is to rotate with the shaft and carries a plurality of drive pins 28 in respective slots 30 for driving a rotary seal assembly 31 which includes a rotary seal member 32. The seal member 32 is sealed to the periphery of the sleeve 14 by an O-ring 34 which is received in a groove 36.

The seal member 32 includes a face 38 which rotates against a stationary face 40 of a stationary seal member 42. The seal member 42 may be a carbon material and preferably lapped to 2 Helium Light Bands.

The seal member 42 is mounted in an adapter 44 which is urged toward the seal member 32 by way of a plurality of circumferentially-spaced springs 46 mounted in respective bores 48 in a housing 50.

The housing 50 is secured to the machine wall 56 by way of a flange 52 and a plurality of machine screws 54 and has a gasket 57 to seal between the housing 15 and the machine wall 56. The housing 50 also includes an internal groove which receives an O-ring 58 to seal to the adapter.

In order to ensure proper axial and radial positioning between the rotary seal assembly 12 and the stationary seal assembly 13, a positioning assembly 60 is provided. The positioning assembly 60 includes an abutment area 61 provided on the rotary seal assembly, and a positioning groove 62 provided on the stationary seal assembly.

The abutment area 61 includes a first abutment face 63, disposed on the sleeve 14, that extends generally parallel to the axis of the shaft 11. The abutment area also includes a second abutment face 64, disposed on the lock ring 19, that extends generally perpendicular to the axis of the shaft 11.

The positioning groove 62 includes a first groove face 65 that extends generally parallel to the axis of the shaft 11, and a second groove face 66 that extends generally perpendicular to the axis of the shaft 11.

The positioning assembly 60 also includes an elongated spacer strip 67 having an enlarged end tab 68.

As best seen in FIGS. 2, 3 and 4, the plastic strip 66 includes an end tab 68 and the strip is positioned about the sleeve 14 and moved into a slot 70 of the housing 50, the slot 70 being tangential to the sleeve 14. The strip 66 may be positioned with the end tab 68 facing in either direction, depending on the direction of rotation of the shaft.

The stationary and rotary seal assemblies are assembled together into an installation position, with the spacer strip 67 in place, before the assemblies are secured with respect to the shaft 11 as shown in FIG. 1. The width of the strip 67 sets the spacing between the first abutment face 63 and the first groove face 65, which determines relative radial positions of the rotary and stationary seal assemblies. In addition, the thickness of the strip 67 sets the spacing between the second abutment face 64 and the second groove face 66, which determines relative axial positions of the rotary and stationary seal assemblies.

Of course, the predetermined radial and axial positions of the seal assemblies are chosen to optimize sealing engagement between the rotary seal member 32 and the stationary seal member 42.

After the shaft seal 10 has been secured with respect to the shaft 11 with the screws 54, the installer removes the spacer strip 67 from the shaft seal 10 by rotating the shaft 11 on the machine by hand while grasping the enlarged tab 68 and pulling the spacer strip 67 outwardly.

Since the dimensions of the strip 67 have already set the relative axial and radial positions of the seal assemblies as described hereinabove, the seal assembly is then in a proper state of adjustment for operation.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a shaft seal comprising a rotary seal assembly including a rotary seal member, a stationary seal assembly including a stationary seal member, wherein the rotary seal member is adapted for sealing engagement with the stationary seal member, and further wherein said sealing engagement is optimized by placing said seal assemblies into predetermined, relative axial and radial positions, a seal positioning assembly comprising the following:
   a generally planar positioning groove disposed on an inner surface of said stationary seal assembly;
   a generally annular abutment area provided on said rotary seal assembly and adjacent said positioning groove; and
   a removable spacer strip disposed between and in contact with said positioning groove and said abutment area, said spacer strip having a predetermined width and thickness corresponding to said predetermined axial and radial positions of said seal assemblies.

2. A seal positioning assembly according to claim 1, wherein:
   said rotary seal assembly comprises a sleeve and a locking ring upon which said abutment area is formed; and
   said abutment area comprises a first abutment face disposed on said sleeve and extending generally parallel to the axis of said shaft, and a second abutment face disposed on said locking ring and extending generally perpendicular to the axis of said shaft.

3. A seal positioning assembly according to claim 2, wherein:
   said stationary seal assembly comprises a housing including an inner surface upon which said positioning groove is formed; and
   said positioning groove includes a first groove face extending generally parallel to the axis of said shaft, and a second groove face extending generally perpendicular to the axis of said shaft.

4. A seal positioning assembly according to claim 3, wherein, when said strip is in an installation position:
   a first set of opposite sides of said strip define said width of said strip and respectively abut said first groove face and said first abutment face; and
   a second set of opposite sides of said strip define said thickness of said strip and respectively abut said second groove face and said second abutment face.

5. A seal positioning assembly according to claim 4, wherein said housing comprises a slot extending generally tangentially from said positioning groove to an external surface of said housing.

6. A seal positioning assembly according to claim 5, wherein said spacer strip comprises an elongate body and an enlarged end tab adapted to be grasped by a hand of a seal installer.

7. A seal positioning assembly according to claim 6, wherein said spacer strip, when disposed in said positioning groove, extends through said slot with said enlarged end tab disposed externally of said shaft seal.

8. A method of placing rotary and stationary assemblies of a shaft seal into a predetermined relative position, said method comprising the following steps:
   respectively providing said assemblies with a positioning groove and an abutment area;
   placing an elongated spacer strip between said assemblies and in contact with said positioning groove and said abutment area;
   securing said shaft seal with respect to a shaft; and
   removing said elongated strip from said shaft seal.

9. A method according to claim 8, wherein said step of respectively providing comprises providing said positioning groove on said stationary seal assembly, and providing said abutment surface on said rotary seal assembly.

* * * * *